(12) United States Patent
Zhang et al.

(10) Patent No.: US 7,814,040 B1
(45) Date of Patent: Oct. 12, 2010

(54) SYSTEM AND METHOD FOR IMAGE ANNOTATION AND MULTI-MODAL IMAGE RETRIEVAL USING PROBABILISTIC SEMANTIC MODELS

(75) Inventors: Ruofei Zhang, Sunnyvale, CA (US);
Zhongfei Zhang, Vestal, NY (US)

(73) Assignee: The Research Foundation of State University of New York, Binghamton, NY (US)

( * ) Notice: Subject to any disclaimer, the term of this patent is extended or adjusted under 35 U.S.C. 154(b) by 932 days.

(21) Appl. No.: 11/626,835

(22) Filed: Jan. 24, 2007

Related U.S. Application Data (60) Provisional application No. 60/763,848, filed on Jan. 31, 2006.

(51) Int. Cl.
*G06F 17/00* (2006.01)
(52) U.S. Cl. .................................................. 706/45
(58) Field of Classification Search ............ 706/45–47, 706/55; 382/155, 181, 190
See application file for complete search history.

(56) References Cited

U.S. PATENT DOCUMENTS

| 7,430,566 B2 * | 9/2008 | Li et al. ........................... 1/1 |
| 7,458,936 B2 * | 12/2008 | Zhou et al. .................. 600/437 |
| 7,689,585 B2 * | 3/2010 | Zeng et al. ........................ 1/1 |
| 2002/0122596 A1 * | 9/2002 | Bradshaw .................... 382/226 |
| 2002/0161747 A1 * | 10/2002 | Li et al. ......................... 707/3 |

OTHER PUBLICATIONS

Zheng et al., Statistical Correlation Analysis in Image Retrieval, 2002, Patter Recognition, pp. 1-12.*
Jin et al., A semi-naive Bayesian method incorporating clustering with pair-wise constraints for auto image annotation, 2004, ACM, pp. 1-4.*
Feng et al., Multiple Bernoulli Relevance Models for Image and video annotation, 2004, CVPR, pp. 1002-1009.*
Zhang et al., Improving CBIR by Semantically Propagation and cross madality query expansion, 2001, Proceedings of the International Workshop on Multimedia CBIR, pp. 1-4.*
Demptser et al., Maximum Likelihood from Incomplete Data via the EM Algorithm, 1977, Journal of the Royal Statisical Society Series B, vol. 39, No. 1.pp. 1-39.*
Lou et al., A Bayesian network-based framework for semantic image understanding, 2005, PAttern Recognition, pp. 1-16.*
Zhang et al., A probabilistic semantic model for image annotation and multi-modal image retrieval, 2006, Multimedia Systems 12(1):27-33.*

\* cited by examiner

*Primary Examiner*—David R Vincent
(74) *Attorney, Agent, or Firm*—Ostrolenk Faber LLP; Steven H. Hoffberg (57) ABSTRACT

Systems and Methods for multi-modal or multimedia image retrieval are provided. Automatic image annotation is achieved based on a probabilistic semantic model in which visual features and textual words are connected via a hidden layer comprising the semantic concepts to be discovered, to explicitly exploit the synergy between the two modalities. The association of visual features and textual words is determined in a Bayesian framework to provide confidence of the association. A hidden concept layer which connects the visual feature(s) and the words is discovered by fitting a generative model to the training image and annotation words. An Expectation-Maximization (EM) based iterative learning procedure determines the conditional probabilities of the visual features and the textual words given a hidden concept class. Based on the discovered hidden concept layer and the corresponding conditional probabilities, the image annotation and the text-to-image retrieval are performed using the Bayesian framework.

15 Claims, 3 Drawing Sheets

{people(6), mountain(6), sky(5) outdoor(7), rocky(4), snow-capped(2)}

| System | | | | | |
|---|---|---|---|---|---|
| MBRM | animal water wolf house tiger | male-face hair people bear sky | bird grass leopard sail cuckoo | flower red tree meadow outdoor | desert beach mummy building church |
| Present Invention | wolf winter wild animal stone | male-face people hair man monologue | bird cuckoo yellow sand sky | flower red azalea leaf landscape | pyramid Egypt desert mummy beach |

Fig. 5

SYSTEM AND METHOD FOR IMAGE ANNOTATION AND MULTI-MODAL IMAGE RETRIEVAL USING PROBABILISTIC SEMANTIC MODELS

BACKGROUND OF THE INVENTION

Efficient access to multimedia database content requires the ability to search and organize multimedia information. In one form of traditional image retrieval, users have to provide examples of images that they are looking for. Similar images are found based on the match of image features. This retrieval paradigm is called Content-Based Image Retrieval (CBIR). In another type of retrieval system, images are associated with a description or metadata which is used as a surrogate for the image content.

It is noted that audio retrieval systems may also employ pattern recognition and content extraction. Typically, the content extraction operates on a direct semantic level, e.g., speech recognition, while source modeling and musical structure extraction may also be employed. Rarely, however, are implicit semantic concepts derived independently of the express semantic structures expressly presented in the audio sample.

Even though there have been many studies on CBIR, empirical studies have shown that using image features solely to find similar images is usually insufficient due to the notorious gap between low-level features and high-level semantic concepts (called semantic gap) [21]. In order to reduce this gap, region based features (describing object level features), instead of raw features of whole image, to represent the visual content of an image is proposed [5, 22, 7].

On the other hand, it is well-observed that often imagery does not exist in isolation; instead, typically there is rich collateral information co-existing with image data in many applications. Examples include the Web, many domain archived image databases (in which there are annotations to images), and even consumer photo collections. In order to further reduce the semantic gap, recently multi-modal approaches to image retrieval are proposed in the literature [25] to explicitly exploit the redundancy co-existing in the collateral information to the images. In addition to the improved retrieval accuracy, another benefit for the multimodal approaches is the added querying modalities. Users can query an image database either by image, or by a collateral information modality (e.g., text), or by any combination.

In addition to static image retrieval, proposals and systems have been developed to handle object identification, extraction, characterization, and segment retrieval in video programs and samples. In general, these systems directly extend the static image and audio techniques, although they may gain benefit of synchronization and association of audio and video data (and possibly closed caption text, if available). Likewise, analysis of temporal changes allows extraction of objects, analysis of object degrees of freedom, and motion planes within the signal. See, U.S. Pat. Nos. 6,850,252; 6,640,145; 6,418,424; 6,400,996; 6,081,750; 5,920,477; 5,903,454; 5,901,246; 5,875,108; 5,867,386; and 5,774,357, expressly incorporated herein by reference. Automated annotation of images and video content may be used in conjunction with MPEG-7 technologies.

Another use of object identification techniques is to permit efficient compression and/or model-based representation of objects within an image or video stream. Thus, especially in information loss-tolerant compression schemes, an image may be compressed in a vector quantized scheme by representing an object with a symbol (e.g., a word). The symbol, of course, may include a variety of parameters, for example describing scaling, translation, distortion, orientation, conformation, etc, as well as providing an error vector to establish deviance of the original image from the symbol (or model) representation.

A number of approaches have been proposed in the literature on automatic image annotation [1, 10, 11, 17]. Different models and machine learning techniques are developed to learn the correlation between image features and textual words from the examples of annotated images and then apply the learned correlation to predict words for unseen images. The co-occurrence model [19] collects the co-occurrence counts between words and image features and uses them to predict annotated words for images. Barnard and Duygulu et al [1, 10] improved the co-occurrence model by utilizing machine translation models. The models are correspondence extensions to Hofmann's hierarchical clustering aspect model [14, 15, 13], which incorporate multimodality information. The models consider image annotation as a process of translation from "visual language" to text and collect the co-occurrence information by the estimation of the translation probabilities. The correspondence between blobs and words are learned by using statistical translation models. As noted by the authors [1], the performance of the models is strongly affected by the quality of image segmentation. More sophisticated graphical models, such as Latent Dirichlet Allocator (LDA) [3] and correspondence LDA, have also been applied to the image annotation problem recently [2]. Another way to address automatic image annotation is to apply classification approaches. The classification approaches treat each annotated word (or each semantic category) as an independent class and create a different image classification model for every word (or category).

One representative work of these approaches is automatic linguistic indexing of pictures (ALIPS) [17]. In ALIPS, the training image set is assumed well classified and each category is modeled by using 2D multi-resolution hidden Markov models. The image annotation is based on nearest-neighbor classification and word occurrence counting, while the correspondence between the visual content and the annotation words is not exploited. In addition, the assumption made in ALIPS that the annotation words are semantically exclusive may not be necessarily valid in nature.

Recently, relevance language models [11] have been successfully applied to automatic image annotation. The essential idea is to first find annotated images that are similar to a test image and then use the words shared by the annotations of the similar images to annotate the test image.

One model in this category is Multiple-Bernoulli Relevance Model (MBRM) [11], which is based on the Continuous space Relevance Model (CRM) [16]. In MBRM, the word probabilities are estimated using a multiple Bernoulli model and the image block feature probabilities using a nonparametric kernel density estimate. The reported experiment shows that MBRM model outperforms the previous CRM model, which assumes that annotation words for any given image follow a multinomial distribution and applies image segmentation to obtain blobs for annotation.

It has been noted that in many cases both images and word-based documents are interesting to users' querying needs, such as in the Web search environment. In these scenarios, multi-modal image retrieval, i.e., leveraging the collected textual information to improve image retrieval and to enhance users' querying modalities, is proven to be very promising. Some studies have been reported on this problem.

Chang et al [6] applied a Bayes point machine to associate words and images to support multi-modal image retrieval. In

[26], latent semantic indexing is used together with both textual and visual features to extract the underlying semantic structure of Web documents. Improvement of the retrieval performance is reported attributed to the synergy of both modalities. Recently, approaches using multi-modal information for Web image retrieval are emerging. In [23], an iterative similarity propagation approach is proposed to explore the inter-relationships between Web images and their textual annotations for image retrieval. The mutual reinforcement of similarities between different modalities is exploited, which boosts the Web image retrieval performance.

Appendix A provides a list of references relating to content-based image retrieval [CBIR], and latent semantic indexing, each of which is expressly incorporated herein by reference.

SUMMARY OF THE INVENTION

The present invention provides systems and methods for probabilistic semantic modeling of image information and the corresponding learning procedure to address the problem of automatic image annotation and its application to multimodal image retrieval.

The probabilistic semantic model preferably exploits the synergy between the different modalities of the imagery and the collateral information.

While the preferred embodiment focuses on a specific collateral modality—text, it should be apparent that any other collateral modalities, such as audio, time-sequences, hyperlink and reverse-hyperlink analysis, etc. The model may thus be generalized to incorporating other collateral modalities.

Consequently, the synergy here is explicitly represented as a hidden layer between the image and the text modalities. This hidden layer constitutes the concepts to be discovered through a probabilistic framework such that the confidence of the association can be provided. While a preferred embodiment employs unconstrained concepts, it should be apparent that taxonomies, hierarchies, vocabularies, and other intrinsic or extrinsic conceptual frameworks may be provided, either to expressly limit the concepts within the hidden layer, or as an adjunct to the unconstrained concepts. It should also be apparent that, while a single hidden layer is sufficient for the preferred embodiment, multiple hidden layers and/or partial additional layers may be implemented in known manner.

An Expectation-Maximization (EM) based iterative learning procedure is preferably employed to determine the conditional probabilities of the visual features and the words given a hidden concept class. Based on the discovered hidden concept layer and the corresponding conditional probabilities, the image-to-text retrieval and text-to-image retrieval are performed in a Bayesian framework.

While the preferred embodiment relates images to words, it is understood that the input and output of the system are not limited thereby, and the methods and systems described herein may be used to relate any two modalities linked through a hidden concept layer. Likewise, the system is not limited to simply outputting a word set associated with an image, or an image set associated with a word, but rather may be employed within a larger and more complex system to provide automated data processing and/or to implement a control system.

In recent CBIR literature, Corel data have been extensively used to evaluate the retrieval performance [1, 10, 11, 17]. It has been argued [24] that the Corel data are much easier to annotate and retrieve due to its relatively small number of concepts and relatively small variations of visual contents. In addition, the relatively small number (1000 to 5000) of training images and test images typically used in the literature further makes the problem easier and the evaluation less convictive.

In order to truly capture the difficulties in real scenarios such as Web image retreival and to demonstrate the robustness and promise of the inventive model and framework in these challenging applications, a prototype system is evaluated on a collection of 17,000 images with the automatically extracted textual annotation from various crawled Web pages. The model and framework according to the present invention work well in this scale, even considering the very noisy image data set, and substantially outperforms the state-of-the-art peer system MBRM [11].

To achieve the automatic image annotation as well as multimodal image retrieval, a probabilistic semantic model is provided for the training image and the associated textual word annotation dataset. The preferred probabilistic semantic model is developed by the EM technique to determine the hidden layer connecting image features and textual words, which constitutes the semantic concepts to be discovered to explicitly exploit the synergy between imagery and text.

It is therefore an object of the present invention to provide a probabilistic semantic model in which the visual features and textual words are connected via a hidden layer to constitute the concepts to be discovered to explicitly exploit the synergy between the two modalities. An EM based learning procedure is developed to fit the model to the two modalities.

It is a further object of the invention to provide a system and method in which the association of visual features and textual words is determined in a Bayesian framework such that the confidence of the association can be provided.

BRIEF DESCRIPTION OF THE FIGURES

The invention will now be explained with reference to the figures, in which.

DETAILED DESCRIPTION OF THE INVENTION

Probabilistic Annotated Image Model As employed herein, $f_i, i \in [1, N]$ denotes the visual feature vector of images in the training database, where N is the size of the database. $w^j, j \in [1,M]$ denotes the distinct textual words in the training annotation word set, where M is the size of annotation vocabulary in the training database.

In the probabilistic model, we assume the visual features of images in the database, $f_i = [f_i^1, f_i^2, \ldots, f_i^L]$, $i \in [1, N]$ are known i.i.d. samples from an unknown distribution.

The dimension of the visual feature is L. We also assume that the specific visual feature annotation word pairs $(f_i, w^j)$, $i \in [1,N]$, $j \in [1,M]$ are known i.i.d. samples from an unknown distribution. Furthermore we assume that these samples are associated with an unobserved semantic concept variable $z \in Z = \{z_1, \ldots z_k\}$. Each observation of one visual feature $f \in F = \{f_1, f_2, \ldots, f_N\}$ belongs to one or more concept classes $z_k$ and each observation of one word $w \in V = \{w^1, w^2, \ldots, w^M\}$ in one image $f_i$ belongs to one concept class. To simplify the model, we have two more assumptions. First, the observation pairs $(f_i, w^j)$ are generated independently. Second, the pairs of random variables $(f_i, w^j)$ are conditionally independent given the respective hidden concept $z_k$, $$P(f_i, w^j | z_k) = P_{\mathfrak{F}}(f_i | z_k) P_V(w^j | z_k) \tag{1}$$

The visual feature and word distribution is treated as a randomized data generation process described as follows:
- choose a concept with probability $P_z(z_k)$;
- select a visual feature $f_i \in F$ with probability $P_{\mathfrak{F}}(f_i | z_k)$; and
- select a textual word $w^j \in V$ with probability $P_V(w^j | z_k)$.

Figure 1:
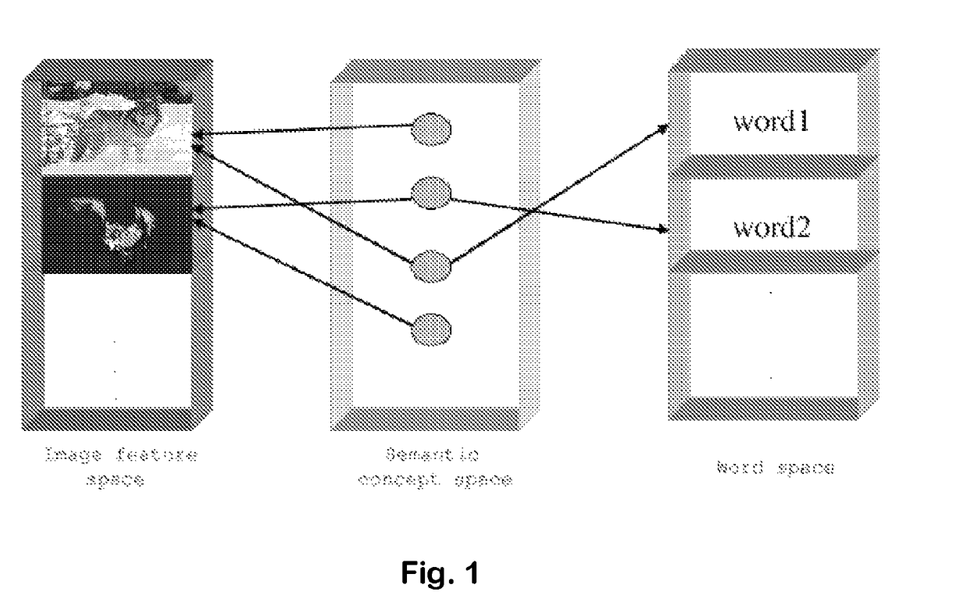
FIG. 1 shows a graphic representation of the model for the randomized data generation for exploiting the synergy between imagery and text.

As a result one obtains an observed pair $(f_i, w^j)$, while the concept variable $z_k$ is discarded. The graphic representation of this model is depicted in FIG. 1.

Translating this process into a joint probability model results in the expression $$P(f_i, w^j) = P(w^j) P(f_i | w^j) \tag{2}$$

$$= P(w^j) \sum_{k=1}^{K} P_{\mathfrak{F}}(f_i | z_k) P(z_k | w^j)$$

Inverting the conditional probability $P(z_k | w^j)$ in (2) with the application of the Bayes' rule results in $$P(f_i, w^j) = \sum_{k=1}^{K} P_z(z_k) P_{\mathfrak{F}}(f_i | z_k) P_V(w^j | z_k) \tag{3}$$

The mixture of Gaussian [9] is assumed for the feature concept conditional probability $P_{\mathfrak{F}}(\bullet | Z)$. In other words, the visual features are generated from K Gaussian distributions, each one corresponding a $z_k$. For a specific semantic concept variable $z_k$, the conditional probability density function (pdf) of visual feature $f_i$ is $$P_{\mathfrak{F}}(f_i | z_k) = \frac{1}{2\pi^{L/2} |\Sigma_k|^{1/2}} e^{-\frac{1}{2}(f_i - \mu_k)^T \Sigma_k^{-1}(f_i - \mu_k)} \tag{4}$$

where $\Sigma_k$ and $\mu_k$ are the covariance matrix and mean of visual features belonging to $z_k$, respectively. The word concept conditional probabilities $P_V(\bullet | Z)$, i.e., $P_V(w^j | z_k)$ for $k \in [1,K]$, are estimated through fitting the probabilistic model to the training set.

Following the maximum likelihood principle, one determines $P_{\mathfrak{F}}(f_i, z_k)$ by maximization of the log-likelihood function $$\log \prod_{i=1}^{N} p_{\mathfrak{F}}(f_i | Z)^{u_i} = \sum_{i=1}^{N} u_i \log \left( \sum_{k=1}^{K} P_z(z_k) p_{\mathfrak{F}}(f_i | z_k) \right) \tag{5}$$

where $u_i$ is the number of annotation words for image $f_i$. Similarly, $P_z(z_k)$ and $P_V(w^j | z_k)$ can be determined by maximization of the log-likelihood function $$\mathcal{L} = \log P(F, V) = \sum_{i=1}^{N} \sum_{j=1}^{M} n(w_i^j) \log P(f_i, w^j) \tag{6}$$

where $n(w_i^j)$ denotes the weight of annotation word $w^j$, i.e., occurrence frequency, for image $f_i$.

EM-Based Procedure for Model Fitting

From (5), (6) and (2) we derive that the model is a statistical mixture model [18], which can be resolved by applying the EM technique [8]. The EM alternates in two steps: (i) an expectation (E) step where the posterior probabilities are computed for the hidden variable $z_k$ based on the current estimates of the parameters; and (ii) an maximization (M) step, where parameters are updated to maximize the expectation of the complete-data likelihood $\log P(F,V,Z)$ given the posterior probabilities computed in the previous E-step.

Thus the probabilities can be iteratively determined by fitting the model to the training image database and the associated annotations.

Applying Bayes' rule to (3), we determine the posterior probability for $z_k$ under $f_i$ and $(f_i, w^j)$:

$$p(z_k | f_i) = \frac{P_z(z_k) P_{\mathfrak{F}}(f_i | z_k)}{\sum_{t=1}^{K} P_z(z_t) P_{\mathfrak{F}}(f_i | z_t) P_V(w^j | z_t)} \tag{7}$$

$$p(z_k | f_i, w^j) = \frac{P_z(z_k) P_z(f_i | z_k) P_V(w^j | z_k)}{\sum_{t=1}^{K} P_z(z_t) P_{\mathfrak{F}}(f_i | z_t) P_V(w^j | z_t)} \tag{8}$$

The expectation of the complete-data likelihood $\log P(F,V,Z)$ for the estimated $\log P(F V, Z)$ derived from (8) is $$\sum_{(i,j)=1}^{K} \sum_{i=1}^{N} \sum_{j=1}^{M} n(w_i^j) \log \left[ P_z(z_{i,j}) p_{\mathfrak{F}}(f_i | z_{i,j}) P_V(w^j | z_{i,j}) \right] P(Z | F, V) \tag{9}$$

where $$P(Z | F, V) = \prod_{s=1}^{N} \prod_{t=1}^{M} P(z_{s,t} | f_s, w^t)$$

In (9) the notation $z_{i,j}$ is the concept variable that associates with the feature-word pair $(f_i, w^j)$. In other words, $(f_i, w^j)$ belongs to concept $z_t$ where $t = (i,j)$.

Similarly, the expectation of the likelihood log P (F,Z) for the estimated P(Z|F) derived from (7) is $$\sum_{k=1}^{K} \sum_{i=1}^{N} \log\left(P_z(z_k) p_{\mathcal{F}}(f_i \mid z_k)\right) p(z_k \mid f_i) \quad (10)$$

Maximizing (9) and (10) with Lagrange multipliers to P$(z_1)$, $p_{\mathcal{G}}(w^v|z_l)$ and $P_V(w^v|z_l)$ respectively, under the following normalization constraints $$\sum_{k=1}^{K} P_z(z_k) = 1, \sum_{k=1}^{K} P(z_k \mid f_i, w^j) = 1 \quad (11)$$

for any $f_i$, $w^j$, and $z_l$, the parameters are determined as $$\mu_k = \frac{\sum_{i=1}^{N} u_i f_i p(z_k \mid f_i)}{\sum_{s=1}^{N} u_s p(z_k \mid f_s)} \quad (12)$$

$$\sum_k = \frac{\sum_{i=1}^{N} u_i p(z_k \mid f_i)(f_i - \mu_k)(f_i - \mu_k)^T}{\sum_{s=1}^{N} u_s p(z_k \mid f_s)} \quad (13)$$

$$P_z(z_k) = \frac{\sum_{j=1}^{M} \sum_{i=1}^{N} u(w_i^j) P(z_k \mid f_i, w^j)}{\sum_{j=1}^{M} \sum_{i=1}^{N} n(w_i^j)} \quad (14)$$

$$P_V(w^j \mid z_k) = \frac{\sum_{i=1}^{N} n(w_i^j) P(z_k \mid f_i, w^j)}{\sum_{u=1}^{M} \sum_{V=1}^{N} n(w_V^u) P(z_k \mid f_V, w^u)} \quad (15)$$

Alternating (7) and (8) with (12)-(15) defines a convergent procedure to a local maximum of the expectation in (9) and (10).

Estimating the Number of Concepts

The number of concepts, K, must be determined in advance for the EM model fitting. Ideally, we intend to select the value of K that best agrees to the number of semantic classes in the training set. One readily available notion of the fitting goodness is the log-likelihood. Given this indicator, we can apply the Minimum Description Length (MDL) principle [20] to select among values of K. This can be done as follows [20]: choose K to maximize $$\log(P(F, V)) - \frac{m_K}{2} \log(MN) \quad (16)$$

where the first term is expressed in (6) and $m_K$ is the number of free parameters needed for a model with K mixture components. In our probabilistic model, we have $$m_K = (K-1) + K(M-1) + K(N-1) + L^2 = K(M+N-1) + L^2 - 1$$

As a consequence of this principle, when models with different values of K fit the data equally well, the simpler model is selected. In our experimental database, K is determined through maximizing (16).

Model Based Image Annotation and Multi-Modal Image Retrieval

After the EM-based iterative procedure converges, the model fitted to the training set is obtained. The image annotation and multi-modal image retrieval are conducted in a Bayesian framework with the determined $P_z(z_k)$, $p_{\mathcal{G}}(f_i|z_k)$, and $P_V(w^j|z_k)$.

Image Annotation and Image-to-Text Retrieval

The objective of image annotation is to return words which best reflect the semantics of the visual content of images.

According to one embodiment of the present invention, a joint distribution is used to model the probability of an event that a word $w^j$ belonging to semantic concept $z_k$ is an annotation word of image $f_i$. Observing (1), the joint (probability is $$P(w^j, z_k, f_i) = P_z(Z_k) p_{\mathcal{G}}(f_i|z_k) P_V(w^j|z_k) \quad (17)$$

Through applying Bayes law and the integration over $P_z(z_k)$, we obtain the following expression:

$$P(w^j \mid f_i) = \int P_V(w^j \mid z) p(z \mid f_i) dz \quad (18)$$
$$= \int P_V(w^j \mid z) \frac{p_{\mathcal{F}}(f_i \mid z) P(z)}{p(f_i)} dz$$
$$= E_z \left\{ \frac{P_V(w^j \mid z) p_{\mathcal{F}}(f_i \mid z)}{p(f_i)} \right\}$$

where $$p(f_i) = \int p\,\mathcal{F}(f_i|z) P_z(z) dz = E_z\{p\,\mathcal{F}(f_i|z)\} \quad (19)$$

In above equations $E_z \{\bullet\}$ denotes the expectation over P$(z_k)$, the probability of semantic concept variables. (18) provides a principled way to determine the probability of word $w^j$ for annotating image $f_i$. With the combination of (18) and (19), the automatic image annotation can be solved fully in the Bayesian framework.

In practice, an approximation of the expectation in (18) is derived by utilizing Monte Carlo sampling [12] technique.

Applying Monte Carlo integration to (18) derives $$P(w^j \mid f_i) \approx \frac{\sum_{k=1}^{K} P_V(w^j \mid z_k) p_{\mathcal{F}}(f_i \mid z_k)}{\sum_{h=1}^{K} p_{\mathcal{F}}(f_i \mid z_h)} \quad (20)$$
$$= \sum_{k=1}^{K} P_V(w^j \mid z_k)_{x_k}$$

where $x_k = \dfrac{p_{\mathcal{F}}(f_i \mid z_k)}{\sum_{h=1}^{K} p_{\mathcal{F}}(f_i \mid z_h)}$ The words with the top highest $P(w^j|f_i)$ are returned to annotate the image. Given this image annotation scheme, the image-to-text retrieval may be performed by retrieving documents for the returned words based on traditional text retrieval techniques. For example, the returned word list may be a predetermined number of words, all words exceeding a probability threshold, or the set of words whose aggregate probabilities exceed a threshold, or a hybrid of these schemes.

Text-to-Image Retrieval

Traditional text-based image retrieval systems, such as the commercial Web search engines, solely use textual information to index images. It is generally accepted that this approach fails to achieve a satisfactory image retrieval, and this perceived failure has actually motivated the CBIR research. Based on the model obtained above to explicitly exploit the synergy between imagery and text, an alternative and much more effective approach to traditional CBIR, using the Bayesian framework to image retrieval given a text query, is provided.

Similar to the derivation in the Image Annotation and Image-to-Text Retrieval section above, we retrieve images for word queries by determining the conditional probability $P(f_i|w_j)$ $$P(f_i | w^j) = \int P_{\varsigma'}(f_i | z) P(z | w^j) dz \qquad (21)$$

$$= \int P_V(w^j | z) \frac{p_{\varsigma'}(f_i | z) P(z)}{P(w^j)} dz$$

$$= E_z \left\{ \frac{P_V(w^j | z) p_{\varsigma'}(f_i | z)}{P(w^j)} \right\}$$

The expectation can be estimated as follows:

$$P(f_i | w^j) \approx \frac{\sum_{k=1}^{K} P_V(w^j | z_k) p_{\varsigma'}(f_i | z_k)}{\sum_{h=1}^{K} P_V(w^j | z_h)}$$

$$= \sum_{k=1}^{K} p_{\varsigma'}(f_i | z_k) y_k$$

where $y_k = \frac{P_V(w^j | z_k)}{\sum_h P_V(w^j | z_h)}$.

The images in the database with the top highest $P(f_i|w^j)$ are returned as the retrieval result for each query word.

EXAMPLE 1

Figure 2:
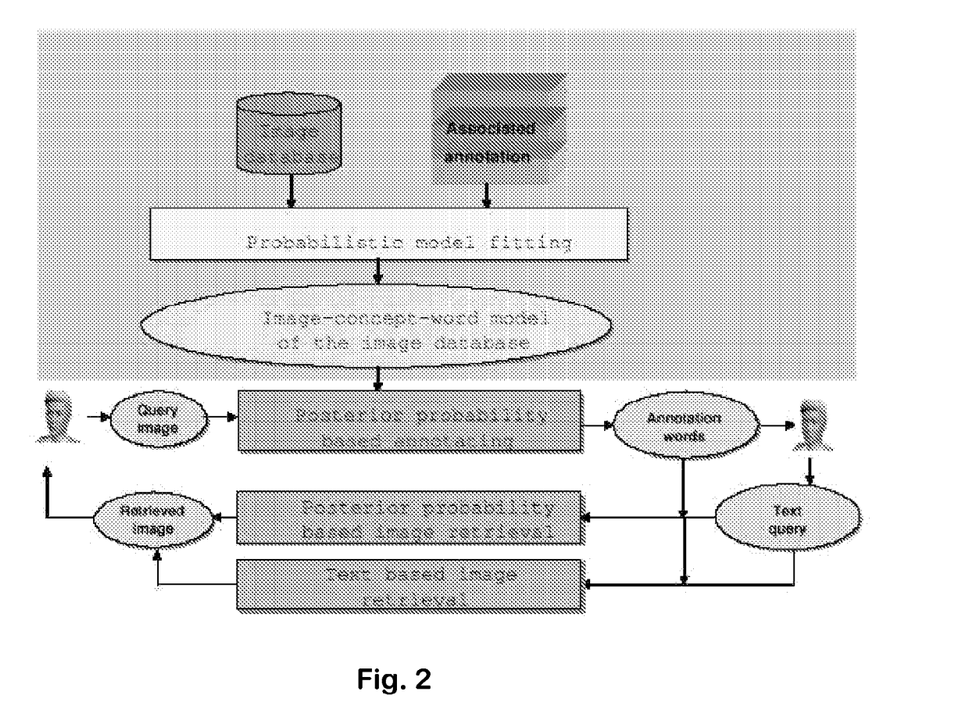
FIG. 2 shows a block diagram of the architecture of the system.

A prototype system was implemented in accordance with the framework set forth above. The architecture of the prototype system is illustrated in FIG. 2, where the "image database" contains the training images as well as testing images; the "associated annotation" contains all the training annotation words. The process of probabilistic model fitting to generate the image-concept-word model (the shaded area in FIG. 2) is processed offline; the text querying and image querying based on the Bayesian framework (the unshaded area in FIG. 2) are performed online.

The system supported both image-to-text (i.e., image annotation) and text-to-image retrievals. As shown in FIG. 2, the image-to-image querying also can be conducted in the system by incorporating the existing commercial text-based image search engines, i.e., the obtained annotation words for the query image are input into an text-based image search engine to retrieve images. Alternatively, the image-to-image retrieval may be conducted by first calling the image-to-text retrieval and then using the retrieved words to conduct the text-to-image retrieval collectively.

Of course, it is also possible to employ the prototype system to retrieve an image output set corresponding to an input image or image set, or to employ two prototype systems linked through either a word query linkage, or bypassing the output layer and linking the hidden layers of each system directly. Note that in this later system, there would be two hidden layers, the interconnections of which must be optimized separately. For example, two separate information domains, each comprising a set of images and words may be provided. Note that, while the formulation of the hidden concept layer is dependent on consistency of the semantic framework of the words used in training, the word usage need not be consistent between the two sets. Rather, the concepts "extracted" from the image-word relationships are anticipated to be consistent. The hidden concepts of the first domain are then mapped to the hidden concepts of the second domain using a second training process. For example, all or a portion of images of the first domain are submitted to the second domain and/or vice versa, and the interconnections of respective hidden concepts optimized to yield minimum error. Efficiencies are obtained by selecting or synthesizing training images for one or both domains which represent exemplars for respective hidden concepts. Alternately, preexisting common images in both domains may be employed to normalize the respective mapping. Further, it is also possible to map the word output of a complete prototype system to another prototype system. It is noted that in the general case, the word output will be considered normalized, and therefore no training or mapping will be required for use of the output of one network as the input for another network.

The word output of a network may be analyzed using traditional linguistic techniques, without departing from the scope and spirit of the present invention. Thus, for example, a semantic taxonomy may be employed to derive express concepts from the word output, or to modify the word input. Note that the express concepts need not be related to the hidden concepts, although according to general understanding, there will be some correlation.

When implemented in a search system, the input may include both an image and text. For example, an exemplar web page may serve as a starting point for retrieval of similar pages. Thus, a trained network may be used in a hybrid environment, as a text to image, image to text, image-to-image and text+image to image and/or text system. Typically, a text-to-text system would not employ the present invention, unless perhaps it is used as an automated language translation system, in which text input is converted to "concepts", which are then mapped to a different text output.

While the system according to the present invention can operate with unprocessed images, it may benefit from preprocessing of images. For example, textual features within images may be extracted using optical character recognition technology, and serve as a separate input or query. Object extraction processing may be used to separate various components from an image or stream, each of which may serve as a separate input or component of an input. Other types of processing may be employed to characterize or otherwise parse an input image. An advantage of separate preprocessing of the image is that, in some special cases, a heuristic or predefined feature extraction scheme may improve the semantic extraction performance of the composite Bayesian+ object-based image annotation and retrieval system.

The processing of images using heuristics and/or object extraction processing schemes is known, and such known techniques may be advantageously used in accordance with the present invention.

EXAMPLE 2

Dataset and Feature Sets

It has been noted that the data sets used in most recent automatic image annotation systems [1, 10, 11, 17] fail to capture the difficulties inherent in many real image databases. Thus, publications reporting performance based on artificially constrained data sets may not be comparable to those using less constrained or unconstrained data sets.

The commonly used Corel database, for example, is much easier for image annotation and retrieval than the unconstrained image data set due to its limited semantics conveyed and relatively small variations of visual contents. The typical small scales of the datasets reported in the literature are far away from being realistic in all the real world applications.

Figure 3:
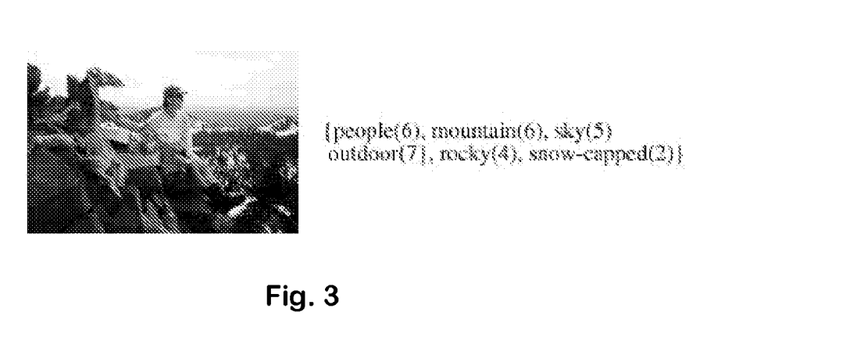
FIG. 3 shows an example of image-annotation-word pairs in the generated database, in which the number following each word is the corresponding weight of the word.

The prototype system according to the present invention was therefore evaluated on a collection of large-scale real world data automatically crawled from the Web, as an example of a minimally constrained image data set. The images and the surrounding text describing the image contents in web pages were extracted from the blocks containing the images by using the VIPS algorithm [4]. The surrounding text is processed using the standard text processing techniques to obtain the annotation words. Apart from images and annotation words, the weight of each annotation word for images was computed by using a scheme incorporating TF, IDF, and the tag information in VIPS, and was normalized to range (0,10). The image annotation word pairs were stemmed and manually cleaned before using as the training database for model fitting and testing. The data collection consisted of 17,000 images and 7,736 stemmed annotation words. Among them, 12,000 images were used as the training set and the remaining 5,000 images were used for the testing purpose. Compared with images in the Corel database, the images in this set were more diverse both on semantics and on visual appearance, which reflect the true nature of image search in many real applications. FIG. 3 shows an image example with the associated annotation words in the generated database.

The present example does not focus on image feature selection and the approach is independent of any visual features. As stated above, various image feature processing techniques may also be employed in conjunction with this technique. For implementation simplicity and fair comparison purpose, similar features to those used in [11] are used in the prototype system. Specifically, a visual feature is a 36 dimensional vector, consisting of 24 color features (auto correlogram computed over 8 quantized colors and 3 Manhattan Distances) and 12 texture features (Gabor energy computed over 3 scales and 4 orientations).

Experiment Design

To evaluate the effectiveness and the promise of the prototype system for image annotation and multi-model image retrieval, the following performance measures are defined:

Hit-Rate3 (HR3): the average rate of at least one word in the ground truth of a test image is returned in the top 3 returned words for the test set.

Complete-Length (CL): the average minimum length of returned words which contains all the ground truth words for a test image for the test set.

Single-Word-Query-Precision (SWQP(n)): the average rate of relevant images (here 'relevant' means that the ground truth annotation of this image contains the query word) in the top n returned images for a single word query for the test set.

HR3 and CL measure the accuracy of image annotation (or the image-to-text retrieval); the higher the HR3, and/or the lower the CL, the better the annotation accuracy. SWQP(n) measures the precision of text-to-image retrieval; the higher the SWQP(n), the better the text-to-image retrieval precision.

Furthermore, we also measure the image annotation performance by using the annotation recall and precision defined in [11].

$$\text{recall} = \frac{B}{C}$$

and $$\text{precision} = \frac{B}{A},$$

where A is number of images automatically annotated with a given word in the top 10 returned word list; B is the number of images correctly annotated with that word in the top-10-returned-word list; and C is the number of images having that word in ground truth annotation. An ideal image annotation system would have a high average annotation recall and annotation precision simultaneously.

Results of Automatic Image Annotation

In the prototype system, words and their confidence scores (conditional probabilities) are returned to annotate images upon users' querying.

Applying the method of estimating the number of hidden concepts described above with respect to the training set, the number of the concepts was determined to be 262. Compared with the number of images in the training set, 12,000, and the number of stemmed and cleaned annotation words, 7,736, the number of semantic concept variables was far less.

In terms of computational complexity, the model fitting was a computation-intensive process; it took 45 hours to fit the model to the training set on a Pentium IV 2.3 GHZ computer with 1 GB memory. However, this process was performed offline and only once. For online image annotation and single word image query, the response time is generally acceptable (less than 1 second).

To show the effectiveness and the promise of the probabilistic model in image annotation, the accuracy of prototype system was compared with that of MBRM [11]. In MBRM, the word probabilities are estimated using a multiple Bernoulli model and no association layer between visual features and words is used. The prototype system was compared with MBRM because MBRM reflects the performance of the state-of-the-art automatic image annotation research. In addition, since the same image visual features are used in MBRM, a fair comparison of the performance is expected.

Figure 5:
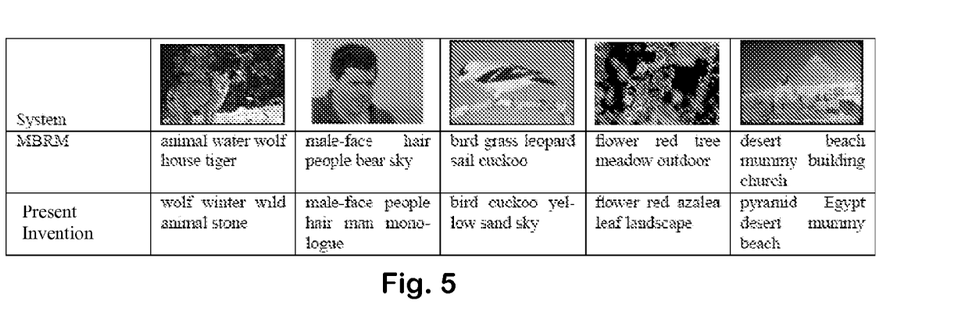
FIG. 5 shows a table of examples of automatic annotations produced by the prior art MBRM technique and the technique according to a preferred embodiment of the invention.

FIG. 5 shows examples of the automatic annotation obtained by the prototype system and MBRM on the test image set. Here, the top 5 words (according to probability) are taken as automatic annotation of the image. It clearly indicates that the prototype system performs better than MBRM. The systematic evaluation results are shown for the test set in Table 1. Results are reported for all (7736) words in the database. The system implemented in accordance with the present invention clearly outperforms MBRM. As is shown, the average recall improves 48% and the average precision improves 69%. The multiple Bernoulli generation of words in MBRM is artificial and the association of the words and features is noisy. On the contrary, in accordance with the present invention, no explicit word distribution is assumed and the synergy between the visual features and words exploited by the hidden concept variables reduces the noises substantially.

TABLE 1

Performance comparison on the task of automatic image annotation on the test set

| | Models | |
|---|---|---|
| | MBRM | Our Model |
| HR3 | 0.56 | 0.83 |
| CL | 1265 | 574 |
| #words with recall >0 | 3295 | 6078 |
| Results on all 7736 words | | |
| Average Per-word Recall | 0.19 | 0.28 |
| Average Per-word Precision | 0.16 | 0.27 |

The system in accordance with the present invention provides better performance. Some returned words with top rank from the prototype system for a given image are found semantically relevant by subjective examinations, although they are not contained in the ground truth annotation of the image. These words were not counted in the computation of the performance in Table 1; consequently, the HR3, recall, and precision in the table may actually be underestimated while the CL may be overestimated for the prototype system.

Results of Single Word Text-to-Image Retrieval

Figure 4:
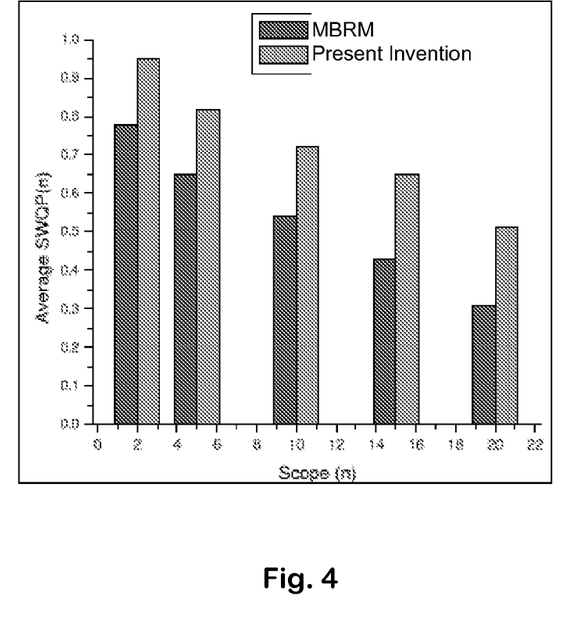
FIG. 4 shows a graph of the average SWQP(n) comparisons between the prior art MBRM technique and the technique according to a preferred embodiment of the invention.

The single word text-to-image retrieval results on a set of 500 randomly selected query words are shown in FIG. 4. The average SWQP(2, 5, 10, 15, 20) of the prototype system and those of MBRM are recorded. A returned image is considered as relevant to the single word query if this word is contained in the ground truth annotation of the image.

It is shown that the performance of the probabilistic model in accordance with the present invention has higher overall SWQP than that of MBRM. It is also noticeable that when the scope of returned images increases, the SWQP(n) in the prototype system attenuates more gracefully than that in MBRM, which is another advantage of the present invention.

The present invention provides a probabilistic semantic model for automatic image annotation and multi-modal image retrieval. Instead of assuming artificial distribution of annotation word and the unreliable association evidence used in many existing approaches, the present invention assumes a hidden concept layer as the connection between the visual features and the annotation words, to explicitly exploit the synergy between the two modalities. The hidden concept variables are discovered and the corresponding probabilities are determined by fitting the generative model to the training set.

The model fitting is performed in the criterion of MLE and an EM based iterative learning procedure is developed. Based on the model obtained, the image-to-text and text-to-image retrievals are conducted in a Bayesian framework, which is adaptive to the data set and has clear interpretation of confidence measures. The model according to the present invention may be advantageously used for image annotation and multi-model image retrieval, which was demonstrated by the evaluation of a prototype system on 17,000 images and the automatically extracted annotation words from crawled Web pages. In comparison with a state-of-the-art image annotation system, MBRM, the present invention shows a higher reliability and superior effectiveness.

In order to reduce training time, it may be possible to use sampling techniques and prior knowledge (e.g., category information of web pages).

APPENDIX A

References (Each of which is expressly incorporated herein by reference)

[1] K. Barnard, P. Duygulu, N. d. Freitas, D. Blei, and M. I. Jordan. Matching words and pictures. *Journal of Machine Learning Research*, 3:1107-1135, 2003.

[2] D. Blei and M. Jordan. Modeling annotated data. In *the 26th International Conference on Research and Development in Information Retrieval (SIGIR)*, 2003.

[3] D. Blei, A. Ng, and M. Jordan. Dirichlet allocation models. In *The International Conference on Neural Information Processing Systems*, 2001.

[4] D. Cai, S. Yu, J.-R. Wen, and W.-Y. Ma. Vips: a vision-based page segmentation algorithm. Microsoft Technical Report (MSRTR-2003-79), 2003.

[5] C. Carson, M. Thomas, and e. a. S. Belongie. Blobworld: A system for region-based image indexing and retrieval. In *The 3rd Intl Conf. on Visual Information System Proceedings*, pages 509-516, Amsterdam, Netherlands, June 1999.

[6] E. Chang, K. Goh, G. Sychay, and G. Wu. Cbsa: Content-based soft annotation for multimodal image retrieval using bayes point machines. *IEEE Trans. on Circuits and Systems for Video Technology*, 13(1), January 2003.

[7] Y. Chen and J. Z. Wang. A region-based fuzzy feature matching approach to content-based image retrieval. *IEEE Trans. on PAMI*, 24(9):1252-1267, 2002.

[8] A. Dempster, N. Laird, and D. Rubin. Maximum likelihood from incomplete data via the em algorithm. *Journal of Royal Statistical Society*, 39(1):1-38, 1977.

[9] W. R. Dillon and M. Goldstein. *Multivariate Analysis, Mehtods and Applications*. John Wiley and Sons, New York, 1984.

[10] P. Duygulu, K. Barnard, J. F. G. d. Freitas, and D. A. Forsyth. Object recognition as machine translation: Learning a lexicon for a fixed image vocabulary. In *The 7th European Conference on Computer Vision*, volume IV, pages 97-112, Copenhagon, Denmark, 2002.

[11] S. L. Feng, R. Manmatha, and V. Lavrenko. Multiple bernoulli relevance models for image and video annotation. In *The International Conference on Computer Vision and Pattern Recognition*, Washington, D.C., June, 2004.

[12] G. Fishman. *Monte Carlo Concepts, Algorithms and Applications*. Springer Verlag, 1996.

[13] T. Hofmann. Unsupervised learning by probabilistic latent semantic analysis. *Machine Learning*, 42:177-196, 2001.

[14] T. Hofmann & J. Puzicha. Statistical models for co-occurrence data. *AI Memo*, 1625, 1998.

[15] T. Hofmann, J. Puzicha, and M. I. Jordan. Unsupervised learning from dyadic data. In *The International Conference on Neural Information Processing Systems*, 1996.

[16] V. Lavrenko, R. Manmatha, and J. Jeon. A model for learning the semantics of pictures. In *the International Conference on Neural Information Processing Systems (NIPS '03)*, 2003.

[17] J. Li and J. Z. Wang. Automatic linguistic indexing of pictures by a statistical modeling approach. *IEEE Trans. on PAMI*, 25(9), September 2003.

[18] G. Mclachlan and K. E. Basford. *Mixture Models*. Marcel Dekker, Inc., Basel, N.Y., 1988.

[19] Y. Mori, H. Takahashi, and R. Oka. Image-to-word transformation based on difiding and vector quantizing images with words. In *the First International Workshop on Multimedia Intelligent Storage and Retrieval Management*, 1999.

[20] J. Rissanen. *Stochastic Complexity in Statistical Inquiry*. World Scientific, 1989.

[21] A. W. M. Smeulders, M. Worring, S. Santini, A. Gupta, and R. Jain. Content-based image retrieval at the end of the early years. *IEEE Trans. on Pattern Analysis and Machine Intelligence*, 22:1349-1380, 2000.

[22] J. Z. Wang, J. Li, and gio Wiederhold. Simplicity: Semanticssensitive integrated matching for picture libraries. *IEEE Trans. on PAMI*, 23(9), September 2001.

[23] X.-J. Wang, W.-Y. Ma, G.-R. Xue, and X. Li. Multimodel similarity propagation and its application for web image retrieval. In *the 12th annual ACM international conference on Multimedia*, pages 944-951, New York City, N.Y., 2004.

[24] T. Westerveld and A. P. de Vries. Experimental evaluation of a generative probabilistic image retrieval model on 'easy' data. In *the SIGIR Multimedia Information Retrieval Workshop* 2003, August 2003.

[25] Z. M. Zhang, R. Zhang, and J. Ohya. Exploiting the cognitive synergy between different media modalities in multimodal information retrieval. In *the IEEE International Conference on Multimedia and Expo (ICME'04)*, Taipei, Taiwan, July 2004.

[26] R. Zhao and W. I. Grosky. Narrowing the semantic gap—improved text-based web document retrieval using visual features. *IEEE Trans. on Multimedia*, 4(2), 2002.

The invention claimed is:

1. A computer-implemented method of retrieving media, comprising:
   (a) creating a probabilistic framework relating media types within a mixed media work to implicit concepts;
   (b) creating an index of a set of media based on implicit concepts within the probabilistic framework;
   (c) receiving a query expressed in the form of a media exemplar;
   (d) determining a set of concepts expressed in the media exemplar;
   (e) searching the index of the set of media for elements representing similar implicit concepts to those expressed in the media exemplar; and
   (f) outputting at least one representation or identifier of the elements representing similar implicit concepts to those expressed in the media exemplar;
   wherein said outputting comprises outputting a representation or identifiers of a plurality of elements, further comprising: ranking the plurality of elements based on at least a similarity of the respective element to implicit concepts expressed in the media exemplar;
   wherein said determining comprises probabilistically determining a set of semantic concepts inherent in the media exemplar, based on correlations of features in respective multimedia works having predetermined semantic concepts associated therewith;
   further comprising determining a concept vector for the media exemplar;
   wherein the probabilistic framework comprises a Bayesian model for associating words with an image having visual features, comprising a hidden concept layer which connects a visual feature layer and a word layer which is discovered by fitting a generative model to a training set comprising images having the visual features and annotation words, wherein the conditional probabilities of the visual features and the annotation words given a hidden concept class are determined based on an Expectation-Maximization (EM) based iterative learning procedure.

2. The method according to claim 1, wherein $f_i, i\epsilon[1,N]$ denotes a visual feature vector of images in a training database, where N is the size of the database, $w^j, j\epsilon[1,M]$ denotes the distinct textual words in a training annotation word set, where M is the size of an annotation vocabulary in the training database, the visual features of images in the database, $f_i=[f_i^1, f_i^2, \ldots, f_i^L], i\epsilon[1,N]$ are known i.i.d. samples from an unknown distribution, having a visual feature dimension L, the specific visual feature annotation word pairs $(f_i, w^j)$, $i\epsilon[1,N], j\epsilon[1,M]$ are known i.i.d. samples from an unknown distribution, associated with an unobserved semantic concept variable $z\epsilon Z=\{z_1 \ldots z_k\}$, in which each observation of one visual feature $f\epsilon F=\{f_1, f_2, \ldots, f_N\}$ belongs to one or more concept classes $z_k$ and each observation of one word $w\epsilon V=\{w^1, w^2, \ldots, w^M\}$ in one image f belongs to one concept class, in which the observation pairs $(f_i, w^j)$ are assumed to be generated independently, and the pairs of random variables $(f_i, w^j)$ are assumed to be conditionally independent given the respective hidden concept $z_k$, such that $$P(f_i, w^j | z_k) = P_\Im(f_i | z_k) P_V(w^j | z_k).$$

3. The method according to claim 2, in which the visual feature and word distribution is treated as a randomized data generation process, wherein a probability of a concept is represented as $P_z(z_k)$; a visual feature is selected $f_i\epsilon F$ with probability $P_\Im(f_i|z_k)$; and a textual word is selected $w^j\epsilon V$ with probability $P_V(w^j|z_k)$, from which an observed pair $(f_i, w^j)$ is obtained, such that a joint probability model is expressed as follows:

$$P(f_i, w^j) = P(w^j)P(f_i | w^j)$$
$$= P(w^j)\sum_{k=1}^{K} P_\Im(f_i | z_k)P(z_k | w^j)$$
$$= \sum_{k=1}^{K} P_z(z_k)P_\Im(f_i | z_k)P_V(w^j | z_k),$$

and the visual features are generated from K Gaussian distributions, each one corresponding to a $z_k$, such that for a specific semantic concept variable $z_k$, the conditional probability density function of visual feature $f_i$ is expressed as:

$$P_\Im(f_i | z_k) = \frac{1}{2\pi^{L/2} |\Sigma_k|^{1/2}} e^{-\frac{1}{2}(f_i-\mu_k)^T \Sigma_k^{-1}(f_i-\mu_k)}$$

where $\Sigma_k$ and $\mu_k$ are the covariance matrix and mean of visual features belonging to $z_k$, respectively.

4. The method according to claim 3, in which word concept conditional probabilities $P_V(\bullet|Z)$, i.e., $P_V(w^j|z_k)$ for $k\epsilon[1,K]$, are estimated through fitting the probabilistic model to the training set.

5. The method according to claim 4, in which $P_\Im(f_i|z_k)$ is determined by maximization of the log-likelihood function:

$$\log \prod_{i=1}^{N} p_{\backslash\tilde{y}}(f_i \mid Z)^{u_i} = \sum_{i=1}^{N} u_i \log \left( \sum_{k=1}^{K} P_z(z_k) p_{\backslash\tilde{y}}(f_i \mid z_k) \right)$$

where $\mu_i$ is the number of annotation words for image $f_i$, and $P_z(z_k)$ and $P_V(w^j|z_k)$ are determined by maximization of the log-likelihood function:

$$\mathcal{L} = \log P(F, V) = \sum_{i=1}^{N} \sum_{j=1}^{M} n(w_i^j) \log P(f_i, w^j)$$

where $n(w_i^j)$ denotes the weight of annotation word $w^j$, i.e., occurrence frequency, for image $f_i$.

6. The method according to claim 5, wherein the model is resolved by applying the expectation-maximization (EM) technique, comprising: (i) an expectation (E) step where the posterior probabilities are computed for the hidden variable $z_k$ based on the current estimates of the parameters; and (ii) an maximization (M) step, where parameters are updated to maximize the expectation of the complete-data likelihood log P (F,V,Z) given the posterior probabilities computed in the preceding E-step, whereby the probabilities can be iteratively determined by fitting the model to the training image database and the associated annotations.

7. The method according to claim 6, wherein Bayes' rule is applied to determine the posterior probability for $z_k$ under $f_i$ and $(f_i, w^j)$:

$$p(z_k \mid f_i) = \frac{P_z(z_k) p_{\backslash\tilde{y}}(f_i \mid z_k)}{\sum_{t=1}^{K} P_z(z_t) P_{\backslash\tilde{y}}(f_i \mid z_t) P_V(w^j \mid z_t)}$$

$$p(z_k \mid f_i, w^j) = \frac{P_z(z_k) P_z(f_i \mid z_k) P_V(w^j \mid z_k)}{\sum_{t=1}^{K} P_z(z_t) P_{\backslash\tilde{y}}(f_i \mid z_t) P_V(w^j \mid z_t)}$$

and expectation of the complete-data likelihood log P (F,V,Z) for the estimated log P(F|V,Z) is $$\sum_{(i,j)=1}^{K} \sum_{i=1}^{N} \sum_{j=1}^{M} n(w_i^j) \log \left[ P_z(z_{i,j}) p_{\backslash\tilde{y}}(f_i \mid z_{i,j}) P_V(w^j \mid z_{i,j}) \right]$$

$$P(Z \mid F, V) \text{ where } P(Z \mid F, V) = \prod_{s=1}^{N} \prod_{t=1}^{M} P(z_{s,t} \mid f_s, w^t)$$

and the notation $z_{i,j}$ is the concept variable that associates with the feature-word pair $(f_i, w^j)$.

8. The method according to claim 6, wherein the expectation of the likelihood log P(F,Z) for the estimated P(Z|F) may be expressed as:

$$\sum_{k=1}^{K} \sum_{i=1}^{N} \log \left( P_z(z_k) p_{\backslash\tilde{y}}(f_i \mid z_k) \right) p(z_k \mid f_i)$$

and the expectation of log P(F,V,Z) and log P(F|V,Z) are maximized with Lagrange multipliers to $P_z(z_l)$, $p_\mathcal{3}(f_u|z_l)$ and $P_V(w^v|z_l)$, under the normalization constraints $$\sum_{k=1}^{K} P_z(z_k) = 1, \sum_{k=1}^{K} P(z_k \mid f_i, w^j) = 1$$

for any $f_i$, $w^j$, and $z_l$, the parameters being determined as $$\mu_k = \frac{\sum_{i=1}^{N} u_i f_i p(z_k \mid f_i)}{\sum_{s=1}^{N} u_s p(z_k \mid f_s)}$$

$$\sum_k = \frac{\sum_{i=1}^{N} u_i p(z_k \mid f_i)(f_i - \mu_k)(f_i - \mu_k)^T}{\sum_{s=1}^{N} u_s p(z_k \mid f_s)}$$

$$P_z(z_k) = \frac{\sum_{j=1}^{M} \sum_{i=1}^{N} u(w_i^j) P(z_k \mid f_i, w^j)}{\sum_{j=1}^{M} \sum_{i=1}^{N} n(w_i^j)}$$

$$P_V(w^j \mid z_k) = \frac{\sum_{i=1}^{N} n(w_i^j) P(z_k \mid f_i, w^j)}{\sum_{u=1}^{M} \sum_{V=1}^{N} n(w_V^u) P(z_k \mid f_V, w^u)}.$$

9. The method according to claim 8, in which the number of concepts, K, is chosen to maximize $$\log(P(F, V)) - \frac{m_K}{2} \log(MN)$$

where $m_K$ is the number of free parameters needed for a model with K mixture components.

10. The method according to claim 9, in which $$m_K = (K-1) + K(M-1) + K(N-1) + L^2 = K(M+N-1) + L^2 - 1.$$

11. The method according to claim 10, wherein a joint distribution $P(w^j, z_k, f_i)$ is used to model the probability of an event that a word $w^j$ belonging to semantic concept $z_k$ is an annotation word of image $f_i$:

$$P(w^j, z_k, f_i) = P_z(z_k) p_\mathcal{3}(f_i \mid z_k) P_V(w^j \mid z_k)$$

or $$P(w^j \mid f_i) = \int P_v(w^j \mid z) p(z \mid f_i) dz$$

$$= \int P_V(w^j \mid z) \frac{p_{\backslash\tilde{y}}(f_i \mid z) P(z)}{p(f_i)} dz$$

$$= E_z \left\{ \frac{P_v(w^j \mid z) p_Y(f_i \mid z)}{p(f_i)} \right\}$$

where
$p(f_i) = \int p_{\mathcal{F}}(f_i|z) P_z(z) dz = E_z\{p_{\mathcal{F}}(f_i|z)\}$, and
$E_z\{\bullet\}$ denotes the expectation over $P(z_k)$.

12. The method according to claim 11, wherein a Monte Carlo integration is used to derive $$P(w^j | f_i) \approx \frac{\sum_{k=1}^{K} P_V(w^j | z_k) p_{\mathcal{F}}(f_i | z_k)}{\sum_{h=1}^{K} p_{\mathcal{F}}(f_i | z_h)}$$

$$= \sum_{k=1}^{K} P_V(w^j | z_k) x_k$$

where $x_k = \dfrac{p_{\mathcal{F}}(f_i | z_k)}{\sum_{h=1}^{K} p_{\mathcal{F}}(f_i | z_h)}$, and wherein the words with the highest $P(w^j|f_i)$ are returned to annotate the image.

13. The method according to claim 10, wherein images are retrieved for word queries by determining the conditional probability $P(f_i|w_j)$ $$P(f_i | w^j) = \int P_{\mathcal{F}}(f_i | z) P(z | w^j) dz$$

$$= \int P_V(w^j | z) \frac{p_{\mathcal{F}}(f_i | z) P(z)}{P(w^j)} dz$$

$$= E_z \left\{ \frac{P_V(w^j | z) p_{\mathcal{F}}(f_i | z)}{P(w^j)} \right\}$$

in which the expectation is estimated as follows:

$$P(f_i | w^j) \approx \frac{\sum_{k=1}^{K} P_V(w^j | z_k) p_{\mathcal{F}}(f_i | z_k)}{\sum_{h=1}^{K} P_V(w^j | z_h)}$$

$$= \sum_{k=1}^{K} p_{\mathcal{F}}(f_i | z_k) y_k$$

where $y_k = \dfrac{P_V(w^j | z_k)}{\sum_{h} P_V(w^j | z_h)}$, and wherein the images in the database with the highest $P(f_i|w^j)$ are returned as the retrieval result for each query word.

14. An apparatus adapted to retrieve media, comprising:
(a) at least one memory, adapted for storing therein a probabilistic framework relating media types within a mixed media work to implicit concepts;
(b) at least one memory, adapted for storing an index of a set of media based on implicit concepts within the probabilistic framework
(c) an input, adapted to receive a query expressed in the form of a media exemplar;
(d) at least one processor, adapted to:
access the at least one memory adapted for storing a probabilistic framework
access the at least one memory adapted for storing an index of a set of media,
receive the query from the input,
determine a set of concepts expressed in the media exemplar, and
search the index of the set of media for elements representing similar implicit concepts to those expressed in the media exemplar; and
(e) an output adapted to present at least one of the elements representing similar implicit concepts to those expressed in the media exemplar;
wherein the probabilistic framework comprises a Bayesian model for associating words with an image having visual features, comprising a hidden concept layer which connects a visual feature layer and a word layer which is discovered by fitting a generative model to a training set comprising images having the visual features and annotation words, wherein the conditional probabilities of the visual features and the annotation words given a hidden concept class are determined based on an Expectation-Maximization (EM) based iterative learning procedure.

15. A non-transitory computer readable medium storing therein instructions for controlling a programmable processor to perform the steps of:
(a) creating a probabilistic framework relating media types within a mixed media work to implicit concepts;
(b) indexing a set of media based on implicit concepts within the probabilistic framework, and storing the index in a memory;
(c) receiving a query expressed as a media exemplar;
(d) determining a set of concepts expressed in the media exemplar;
(e) searching the stored index of the set of media for elements representing similar implicit concepts to the media exemplar; and
(f) outputting a representation or identifier of at least one of the elements representing similar implicit concepts to the media exemplar;
wherein the probabilistic framework comprises a Bayesian model stored in a memory for associating words with an image having visual features, comprising a hidden concept layer which connects a visual feature layer and a word layer which is discovered by fitting a generative model to a training set comprising images having the visual features and annotation words, wherein the conditional probabilities of the visual features and the annotation words given a hidden concept class are determined based on an Expectation-Maximization (EM) based iterative learning procedure.

* * * * *